Oct. 12, 1965  F. SCHWARZ  3,211,912
PHOTOSENSITIVE MULTI-ELEMENT DETECTOR SAMPLING SYSTEM
Filed March 7, 1963
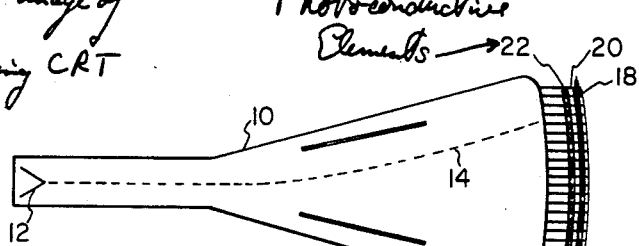
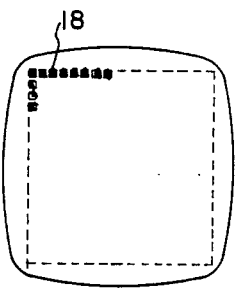
FIG. 1
FIG. 2
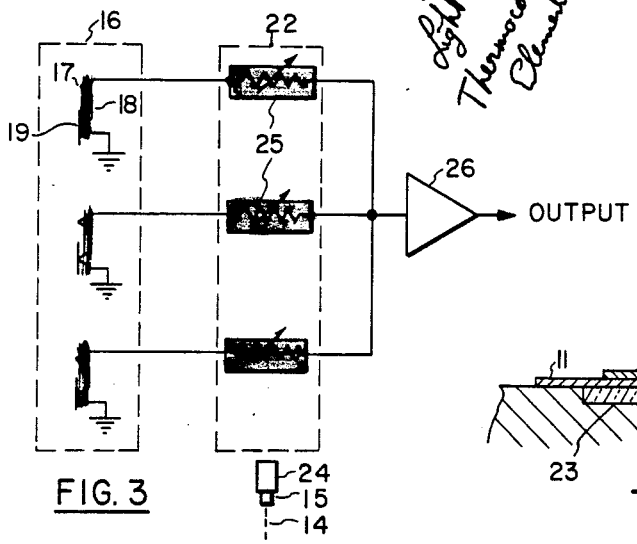
FIG. 3
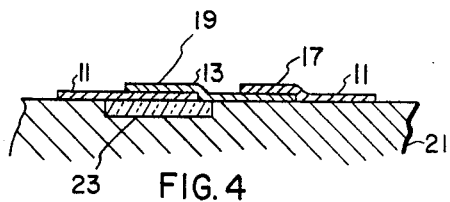
FIG. 4
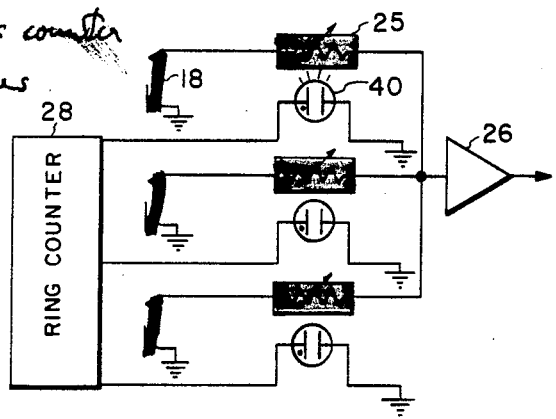
FIG. 6
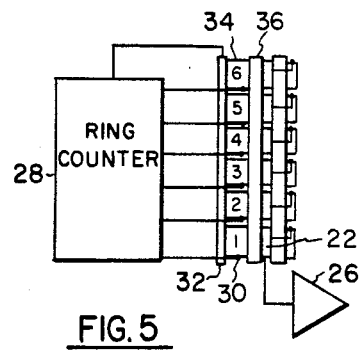
FIG. 5
INVENTOR.
FRANK SCHWARZ
BY *Joseph Levinson*
ATTORNEY United States Patent Office 3,211,912
Patented Oct. 12, 1965

3,211,912
PHOTOSENSITIVE MULTI-ELEMENT DETECTOR
SAMPLING SYSTEM
Frank Schwarz, Stamford, Conn., assignor to Barnes Engineering Company, Stamford, Conn., a corporation of Delaware
Filed Mar. 7, 1963, Ser. No. 263,609
2 Claims. (Cl. 250—209)

This invention relates to a multi-element detector sampling system, and more particularly to such a system in which the output of the detectors to be sampled is at such low signal levels that switching noise cannot be tolerated.

To usefully analyze radiation and make measurements thereof by use of infrared cameras, horizon sensors, and the like, it is often necessary to scan a target area to provide the necessary information. The scanning is often accomplished by use of mirrors, lenses or prisms, which are mechanically driven and which image the object or target onto a detector. Such scanning equipment is bulky, expensive, slow moving, and also the wear on these components and need for lubrication makes such systems undesirable where long unattended operation or high reliability are prime requirements, such as in space craft instrumentation. The speed with which the system operates is also controlled a great deal by the operating characteristics of the detector on which the information, in the form of radiation, is imaged. For example, the speed of scanning would be restricted by the response of the detector. One way of obviating these problems might reside in providing a plurality of detectors which are positioned in a manner to receive radiation from an area from which radiation information is desired to be secured. In using such an arrangement, each detector would have to be connected to a plurality of amplifying means, or scanned in a predetermined sequence to apply their outputs selectively to electronic circuitry for amplification and further processing. In such an arrangement, switching devices would be necessary which offer low noise including the absence of switching transients, offset voltages, or switching signal feedthrough.

Accordingly, it is an object of the present invention to provide a new and improved multi-element detector sampling system.

A further object of this invention is to provide a multi-element detector sampling system which provides a sensitive, dependable, high-speed and high-resolution scanner having no moving parts.

Another object of this invention is to provide a multi-element detector sampling system which utilizes a photoconductive switching arrangement which effectively passes signals from the detector without swamping such signals out by switching noise or offset voltages which may vary with temperature.

It is a further object of this invention to provide a multi-element detector sampling system which is capable of providing a scan pattern of any desired configuration.

In carrying out this invention in one illustrative embodiment thereof, a multi-element detector sampling system is provided which includes a mosaic or array of radiation detectors which are adapted to receive radiation from an object or area to be examined. A corresponding mosaic or array of photoconductive elements are electrically interconnected with corresponding elements on the array of radiation detectors which are adapted to receive radiation from an object or area to be examined. The photoconductive elements are connected to an amplifier or amplifiers and other electronic utilization means, and means are provided for selectively illuminating the photoconductive elements in a predetermined sequence, whereby the detectors are selectively connected in such a predetermined sequence to the electronic utilization means.

The invention, both as to organization and method of operation, together with further objects and advantages thereof, may best be understood by reference to the following description taken in connection with the accompanying drawings, in which:

FIG. 1 is a diagram of the new and improved multi-element detector sampling system utilizing a conventional cathode ray tube for providing the sampling or scanning function, FIG. 2 is a front view of the detector mosaic utilized in the invention as shown in FIG. 1, FIG. 3 is an electrical schematic of the multi-element detector sampling system shown in FIG. 1, FIG. 4 is a sectional view of a solid backed thermocouple detector which may be utilized in the present invention, FIG. 5 is a schematic diagram of an embodiment of this invention utilizing a sequentially actuated electroluminescent panel for performing the sampling or scanning function, and FIG. 6 is a schematic diagram of another embodiment of this invention which uses sequentially actuated luminous sources for performing the sampling function.

The term detector as used in this application refers to any type of transducer which produces a direct current or low frequency electrical output signal in response to energy applied thereto. For radiation detectors such types as photoconductors, photovoltaic detectors, thermistor bolometers, thermoelectric detectors or other suitable types may be used. The types such as thermoelectric and photovoltaic detectors which generate a voltage in response to radiation are preferable in the present application, but the invention is not limited to these. These detectors, unlike thermistor or photoconductive detectors, do not require application of a bias potential. Consequently, the signals they produce vary only in response to radiation received and are not a function of the stability of the bias supply or a delicate balancing of two elements of a bridge in the face of varying ambient temperatures. Accordingly, the invention is described in connection with the use of solid backed thermocouples. Thermocouples may be made in the form of thin films which are vacuum deposited on substrates. The vacuum deposition technique lends itself to the ready fabrication of a variety of thermocouple and thermopile configurations which may be employed in accordance with this invention.

Referring now to FIG. 1, one form of the multi-element detector sampling system embodied in this invention is shown. It consists of a conventional cathode ray tube 10, having a cathode 12 which generates an electron beam 14. The electron beam 14 is caused to scan by a conventional scanning system (not shown) in any desired manner across a phosphor screen 15. A fiber optic face plate 24 and a sandwich, comprising an array or mosaic of photoconductive elements 22 and a thermocouple mosaic or array 16 separated by a substrate 20 of insulating material, are mounted on the face of the cathode ray tube 10. The individual thermocouples 18 of the thermocouple mosaic 16 are electrically connected to corresponding photoconductive elements 25 of the photoconductive mosaic 22. The photoconductive mosaic 22 may be deposited directly on the fiber optic face plate 24 and the entire unit may be fabricated as an integral unit.

The detector mosaic 16 is made up of thermocouples which may be arranged in any desired configuration to receive radiation from a target scene. As is best shown in FIG. 4, the thermocouple 18 consists of a reference junction 17 and an active junction 19 formed by two dissimilar metals 11 and 13. The active junction 19 is insulated from a heat sink 21 by an insulating layer 23, while the reference junction 17 is in good thermal contact therewith, but electrically insulated therefrom. These thermocouples are mounted on an insulated substrate 20, which separates them from the photoconductors 25. Although the thermocouple is a low impedance device, the impedance may be increased somewhat by connecting several in series to form a variety of thermopile configurations.

Although numerous configurations of the detectors may be provided, the one shown in FIG. 2 forms a full X-Y axis frame. It will be understood by those skilled in the art that a straight-line array or a circular configuration, or any desired configuration, may be provided as desired, which would only require a change in the means for properly scanning the desired array. For a full picture as shown by the array on FIG. 2, the only inherent limitation would be the spacing between detector elements. If desired, the gaps or spaces between detectors could be filled in by a duplicate array which is complementary. With two such arrays, a complete picture with no spaces could be formed by combining the results from each.

The mosaic of photoconductive elements 22 has a configuration corresponding to that of the thermal detector mosaic 16. The photoconductive elements 25 making up the photoconductive mosaic 22 may be cadmium sulphide, cadmium selenide, or any other suitable photoconductive material which is characterized by a change of resistance from it dark condition, which might be several megohms, to its illuminated resistance of tens or hundreds of ohms. Accordingly, when the photoconductive element 25 is illuminated, it becomes a conductor to the particular thermal detector element to which it is connected. Thus, in its inactivated or dark state, the photoconductive element 25 resembles an open circuit or open switch, while in its illuminated or activated position, it represents a closed switch or low-impedance path. It is desirable for the photoconductive element 25 to provide a low impedance, since the thermocouples or thermopiles associated therewith are low impedance devices.

The electronic operation of the scanning system is shown schematically in FIG. 3. The electron beam 14 of the conventional cathode ray tube is caused to scan the phosphor 15 in a predetermined manner corresponding to the arrangement of the thermal detectors 18. As the phosphor 15 is illuminated by the electron beam 14, the light emanating therefrom is transmitted through the fiber optic light pipe 24 to the appropriate photoconductive element 25 on the mosaic 22. On being illuminated, the resistance of the photoconductive element 25 drops enormously from its dark resistance value to a very low resistance value representing a closed switch. The photoconductive element 25 thus becomes an electrical conductor connecting the thermocouple 18 to an amplifier 26. As the cathode ray beam 14 scans in a prescribed manner, the sampling and sequence thereof is established through illumination to sequentially connect thermocouples 18 to the amplifier 26 in a prescribed sequence. Each detector element is successively connected to the amplifier 26, which amplifies the voltage associated with each of the thermocouple elements to provide a complete thermal profile of the target scene which has been scanned. The output of the amplifier 26 may be applied to a monitor oscilloscope, stored on film or tape, or metered, as desired.

The fiber optic face plate 24, which includes a plurality of light pipes, at least one for each of the photoconductive elements, provides direction to the light emanating from the phosphor. In the absence of the light pipes, there would be a dispersion of this light, which could result in simultaneous illumination of several adjacent photoconductive elements. Such interaction could reduce the resolution of the system. Similar results might be obtained by masking portions of the cathode ray tube phosphor with a pattern similar to that of the mosaic, so that only portions of the tube pass light, or in another form, the phosphor may be placed on the cathode ray tube at spaced intervals in accordance with the array of the photoconductive mosaic 22.

Another embodiment of the invention is shown in FIG. 5. In this embodiment, a mosaic of electroluminescent elements is substituted for the cathode ray tube fiber optic portion of the device shown in FIG. 1. In this embodiment, a switching arrangement utilizing a ring counter 28 is connected to an electroluminescent panel 30, which is illuminated by pulse actuation from the ring counter in a predetermined sequence in accordance with the scan pattern. The panel 30 has an electrode 32, a plurality of luminescent dielectrics 34, and an insulator 36 separating the panel 30 from the photoconductive array 22. Only six luminescent panels are shown with connections to the ring counter 28 for ease of illustration. The operation of this system is the same as that of the previous embodiment as discussed in connection with FIG. 3, except that the illuminated parts of the panel which are excited by a potential from the ring counter activate the photoconductors instead of the phosphor actuated by a cathode ray beam.

The embodiment of FIG. 6 utilizes a plurality of luminous sources such as gaseous discharge devices for illuminating the photoconductive elements 25. The luminous sources 40 are actuated sequentially in any desired predetermined pattern by pulses from the ring counter 28. The use of gaseous discharge devices, such as neon bulbs, offers the advantage of flexibility in the different arrangements and configurations that can be made, which might overcome some of the deflection problems, for example in the cathode ray scanning arrangement or in the physical positioning problems which might be encountered in the electroluminescent panel configurations.

The multi-element detector sampling system embodied in this invention offers a solid-state device with no moving parts, making it relatively simple mechanically, and offering long life with no lubrication problems. The invention may be applied to such devices as multi-element horizon sensors, tracking devices, thermographs, and solid-state line scanners. The detectors of the system may be arranged in a wide range of patterns and scanned by illuminative actuation of the photoconductors associated with the detectors in a prescribed sequence. This provides flexibility and makes this sampling system feasible for a large number of applications.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent of the United States is:

1. A multi-element detector sampling system comprising
   (a) a cathode ray tube having a phosphor screen which is sequentially illuminated by a cathode ray tube beam in a predetermined scanning sequence,
   (b) a face plate mounted on said cathode ray tube which includes a sandwich comprising an array of photoconductive elements and a corresponding array of radiation detectors separated by a substrate of insulating material,
   (c) utilization means,
   (d) electrical means for interconnecting each detector element to a corresponding photoconductive element, and
   (e) electrical means for connecting said photoconductive elements to said utilization means whereby the detector elements are sequentially connected to said utilization means in synchronism with the scanning sequence of said cathode ray beam which illuminates said phosphor screen and at least one of said photoconductive elements which is mounted thereon.

2. The structure set forth in claim 1 wherein said face plate includes a plurality of fiber optic light pipes including at least one for each of said photoconductive elements interposed between said screen and said photoconductive elements for preventing simultaneous illumination of several adjacent photoconductive elements.

References Cited by the Examiner

UNITED STATES PATENTS

| | | | |
|---|---|---|---|
| 2,015,838 | 10/35 | Borden et al. | 219—20.41 X |
| 2,534,369 | 12/50 | Ress | 250—217.1 X |
| 2,640,880 | 6/53 | Aigrain et al. | 250—217 X |
| 2,886,739 | 5/59 | Matthews et al. | 250—211.1 X |
| 2,959,349 | 11/60 | Marsh et al. | 250—209 X |
| 2,961,546 | 11/60 | Spingies et al. | 250—208 |
| 2,975,286 | 3/61 | Rappaport et al. | 250—219.1 X |
| 2,998,530 | 8/61 | Marshall | 250—213 |
| 3,058,021 | 10/62 | Dunn | 250—227 X |
| 3,122,734 | 1/64 | Rice | 250—213 X |

FREDERICK M. STRADER, *Primary Examiner.*

WALTER STOLWEIN, RALPH G. NILSON, *Examiners.*